United States Patent [19]

Cools

[11] 4,291,523
[45] Sep. 29, 1981

[54] ROW CROP APPARATUS

[75] Inventor: Antoon S. P. Cools, St. Kruis-Brugge, Belgium

[73] Assignee: Sperry Corporation, New Holland, Pa.

[21] Appl. No.: 146,940

[22] Filed: May 2, 1980

[30] Foreign Application Priority Data

May 4, 1979 [GB] United Kingdom ............... 15557/79

[51] Int. Cl.³ ...................... A01D 45/00; A01D 69/12
[52] U.S. Cl. ...................................... 56/94; 56/12.3; 56/98
[58] Field of Search ...................... 56/6, 13.6, 14.3, 94, 56/98, 84, 12.3, 235

[56] References Cited

U.S. PATENT DOCUMENTS

| 1,911,491 | 5/1933 | Christiance | 56/109 |
| 3,524,306 | 8/1970 | Reber | 56/13.6 |
| 3,623,300 | 11/1971 | Konig et al. | 56/6 |
| 4,084,396 | 4/1978 | Fritz et al. | 56/98 |
| 4,086,749 | 5/1978 | Greiner et al. | 56/98 |
| 4,103,476 | 8/1978 | Oosterling et al. | 56/13.6 |
| 4,204,387 | 5/1980 | Eistert et al. | 56/98 |
| 4,211,059 | 7/1980 | Decoene | 56/94 |

FOREIGN PATENT DOCUMENTS 2369785  7/1978  France ................................. 56/94

Primary Examiner—Paul J. Hirsch
Attorney, Agent, or Firm—James R. Bell; Frank A. Seemar

[57] ABSTRACT

Problems associated with row crop attachments for harvesting machines are limited by replacing previously known gathering chains with a plurality of rotary elements adapted to define a stalkway formed of intermeshing rotary crop conveyors.

2 Claims, 5 Drawing Figures

ROW CROP APPARATUS

BACKGROUND OF THE INVENTION

This invention relates generally to harvesters, and more particularly, to those of the cornstalk type with gatherers.

In the preparation of forage from "stalk" crops, such as corn and sorghum, the entire stalk, including the grain, is cut and fed to a chopping or cutter unit for chopping into small feed pieces. Forage harvesters for preparing forage in this way normally comprise a base unit having a chopping mechanism and a crop gathering unit which cuts the crop and conveys it to the chopping mechanism. The chopped or cut crop is blown, or otherwise conveyed, into a trailing wagon or the like in which it is transported to a silo or other storage facility.

Crop gathering attachments have been developed to cut one, two, three or four rows of crop at one time. These gathering means comprise a mechanism for severing the stalks and delivering them butt ends first, between opposed feed elements, and a pair of laterally opposed gathering frames for each row of crop, the frames defining between them a stalk-receiving passage in advance of, and aligned with, the feed elements. Angularly disposed flights of gathering chains are usually provided along the gathering frames to insure that the stalks move rearwardly into the forage harvester and to hold the stalks in the required orientation until they are acted upon by the feed elements. The gathering frames customarily are provided with rearwardly and upwardly inclined fenders or surfaces over which the stalks may ride and be supported during their movement through the gathering means.

In the past a large number of moving parts have been incorporated in the crop gathering means. Usually two or more pairs of superposed gathering chains, and associated drive means, have been employed per row of crop handled by the harvester. Such a large number of moving parts not only requires a great amount of motive power but also increases the cost of manufacture, maintenance and operation. Also, the gathering chains, which are quite expensive, are fast-wearing components and it is not exceptional to have to replace all gathering chains at the end of every season and even replacement during the course of a season is sometimes necessary. Chain replacement is a time-consuming, cumbersome and expensive exercise. In addition, the large number of moving parts and their supporting structure result in a relatively heavy crop gathering attachment which is particularly undesirable in certain machines. For example, in some forage harvesters the crop gathering attachment used to harvest corn may be interchanged with other attachments, such as those used for picking up hay in windrows or direct cutter units for grass. A heavy or bulky gathering unit increases the difficulty of attachment and detachment, and also of supporting and adjusting the gathering unit relative to the base unit. As the gathering attachments are attached to the forward end of the base unit, heavy attachments may result in an undesirable positioning of the center of gravity relative to the wheel base of the machine.

Despite the large number of crop engaging components normally employed, some of the severed crop escapes the action of the conveying means and either becomes entangled in the various components and plugs the machine or falls to the ground and is a loss to the harvesting operation.

Other crop gathering attachments have only one pair of gathering chains per crop row. The height of such attachments is substantially smaller than the height of those described above and, therefore, these attachments are often identified as "low profile" attachments. The drive means in a "low profile" attachment are less complicated and comprise fewer components, whereby the cost thereof is also reduced accordingly. Unfortunately, such low profile attachments need to be moved much more accurately along the rows of crop, otherwise stalks frequently are missed by the gathering chains and thus lost. This requires the sustained attention of the operator which is tiring and can slow down the operation of the harvester. This problem is accentuated when harvesting corn which has been wholly or partially flattened by storms, or when harvesting tall crop. Also severed stalks occasionally escape the grasp of the gathering chains and are lost. Furthermore, the low profile gathering attachments still have the expensive and fast-wearing gathering chains.

It will be appreciated that the gathering chains are fast wearing due to their constant contact with drive and other sprockets and this is aggravated by corrosion due to rust and to juices from the harvested crop.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing a row crop apparatus including a stalkway defined by a pair of adjacent drive modules. The modules are detachably connected to a supportive frame. A plurality of intermeshed crop conveyors are rotatably mounted in each module. The conveyers of one module extend into the stalkway in rotatable intermeshed relationship with the conveyors of the adjacent module.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
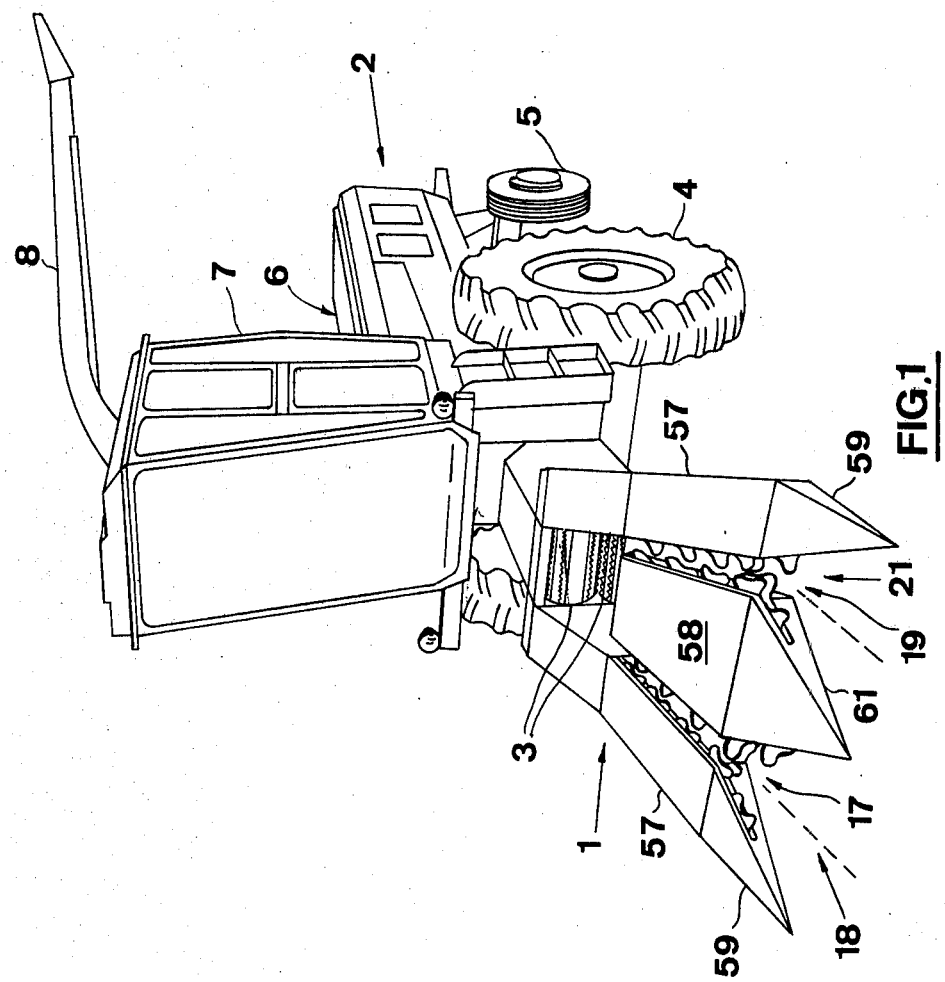
FIG. 1 is a perspective view illustrating an embodiment of the row crop apparatus of this invention operably connected to a self-propelled base unit of a harvesting machine.

Referring to FIG. 1 there is shown a self-propelled forage harvester comprising a row crop attachment or crop gathering unit 1 (constructed in accordance with the present invention) mounted on a base unit 2. The base unit 2 comprises the usual feed rolls 3 and a chopping mechanism or cutter head (not shown), the base unit being supported on a pair of traction wheels 4 and a pair of steerable wheels 5. The base unit 2 further comprises an engine compartment 6 with a power source therein and an operator's cab 7 housing the operator's seat, steering wheel and various controls. The chopping mechanism or cutting head and the feed rolls 3 of the base unit 2 are driven in a conventional manner through gears and pulleys, receiving their power from the power source incorporated in the machine. Chopped material is discharged through a spout 8 into a trailer or the like (not shown).

Figure 2:
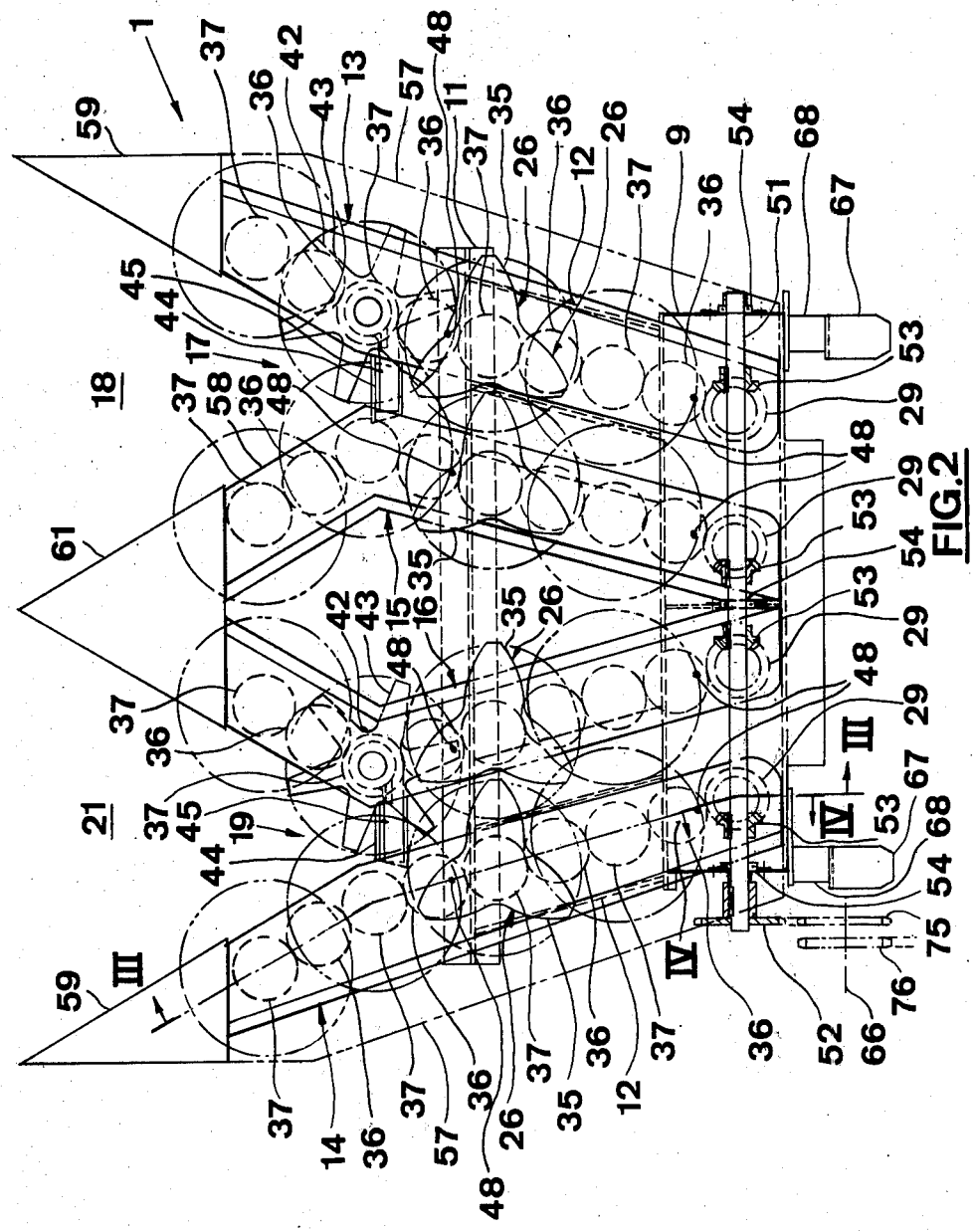
FIG. 2 is a plan view illustrating a schematic embodiment of the row crop apparatus of FIG. 1.
Figure 3:
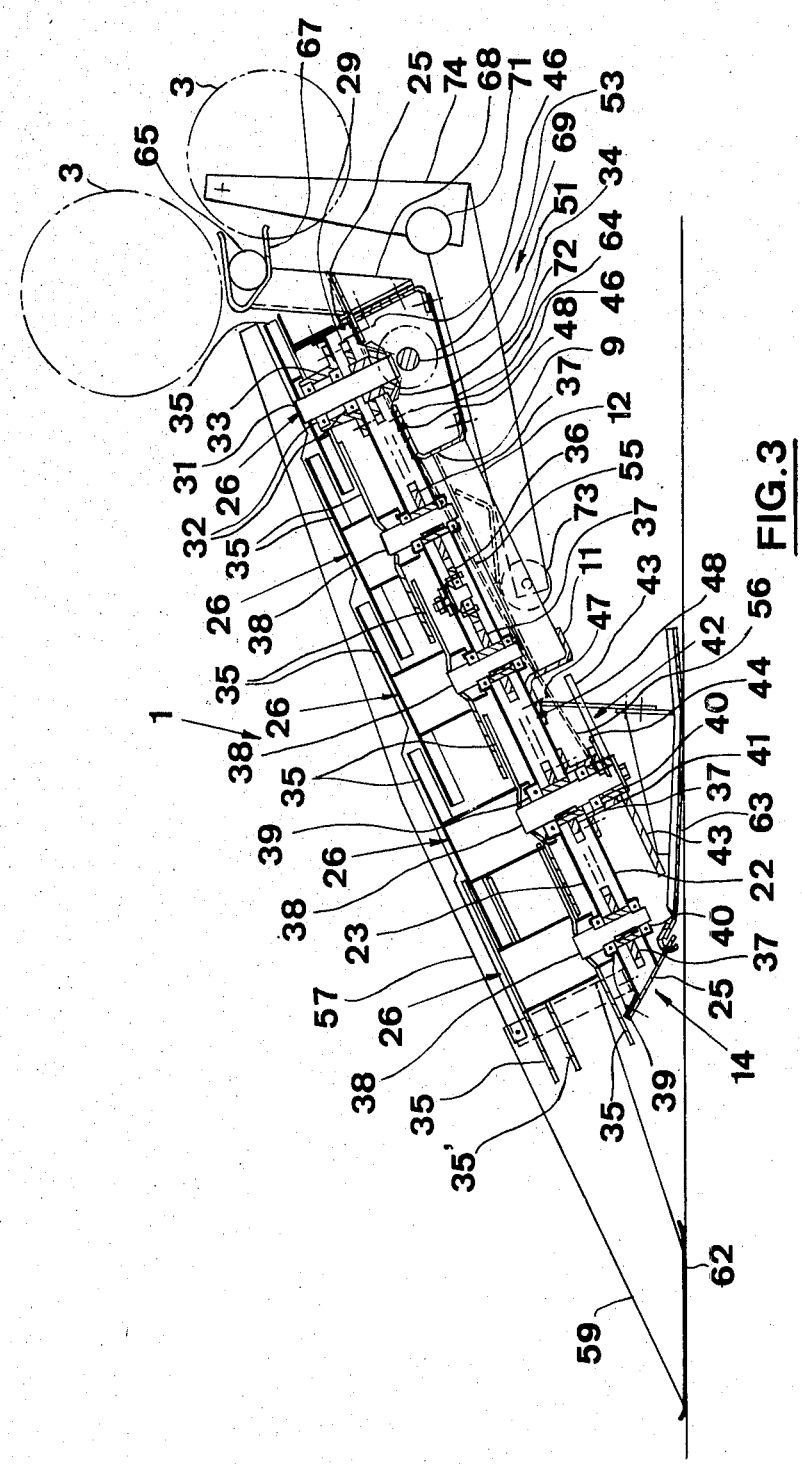
FIG. 3 is a sectional side illustration as viewed along the line III—III of FIG. 2.
Figure 4:
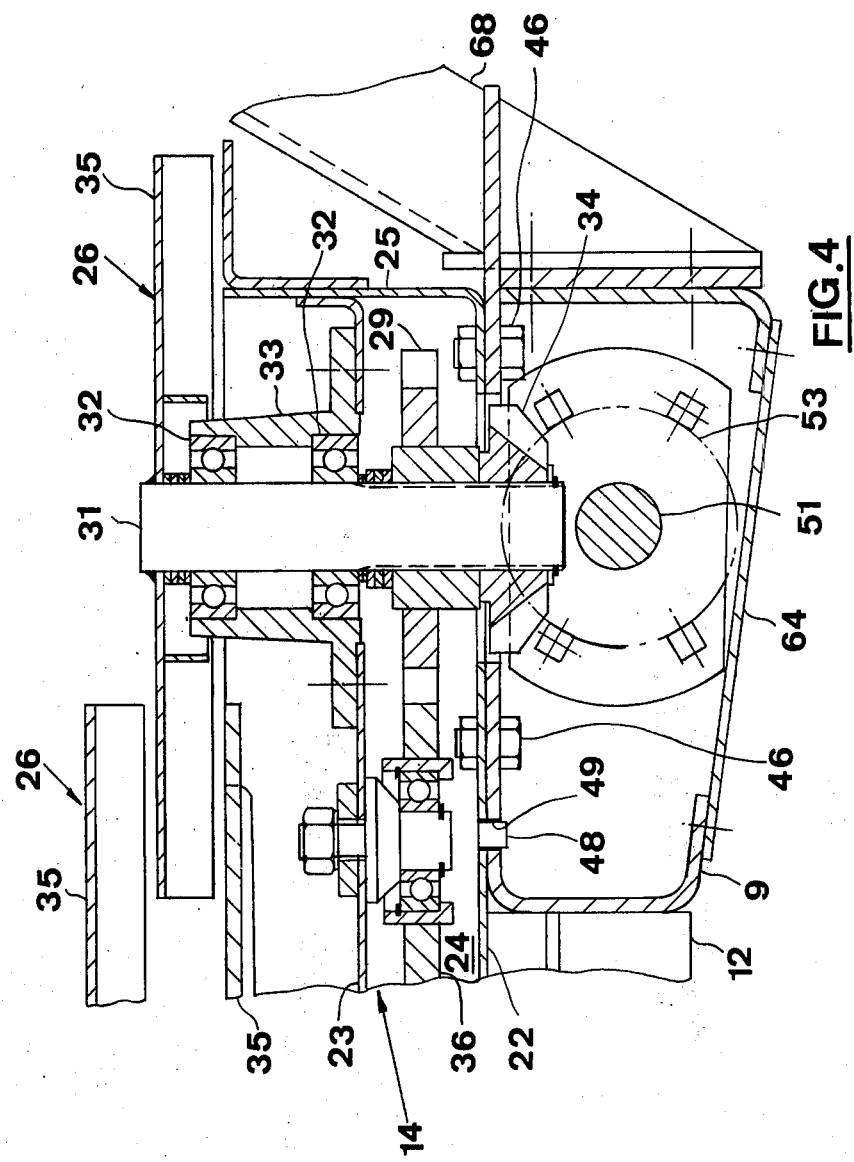
FIG. 4 is a sectional side illustration as viewed along the line IV—IV of FIG. 2.
Figure 5:
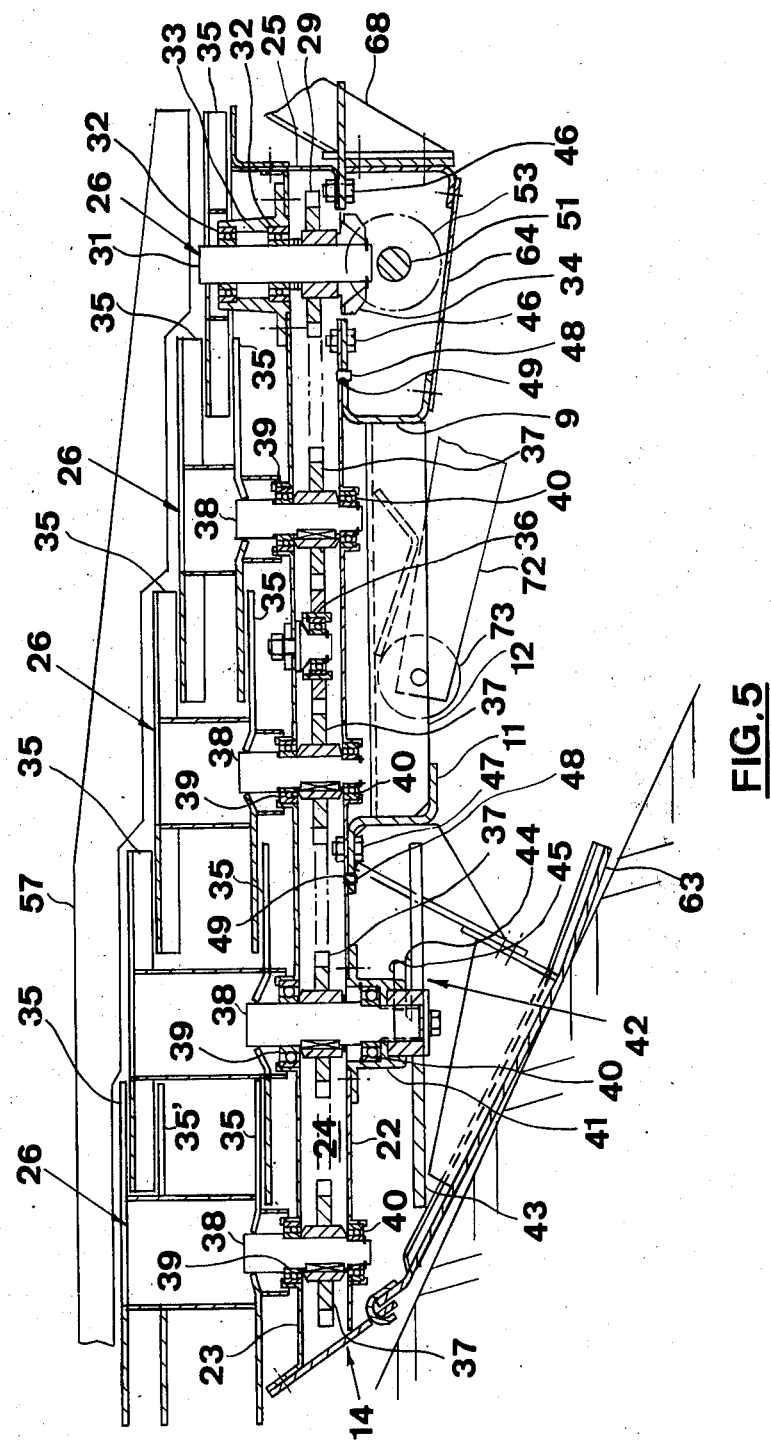
FIG. 5 is a side view illustrating an embodiment of the row crop apparatus of FIG. 1.

Referring now to FIGS. 2 to 4, the row crop attachment comprises a generally rectangular frame formed by a hollow main transverse beam 9, an auxiliary transverse beam 11, and two spaced side beams 12 to which the trnsverse beams are connected and which diverge in a forward direction. Mounted on the frame are four drive modules, namely right- and left-hand outer modules 13 and 14, and two center modules 15 and 16. The center drive module 15 defines with the right-hand drive module a stalkway 17 having a mouth 18, and the center module 16 defines with the left-hand module 14 a stalkway 19 having a mouth 21, the forward ends of the modules being cranked to form the mouths 18 and 21.

Apart from differences in shape, as seen in plan view (FIG. 2), between the four drive modules 13 to 16, the basic construction is similar and each comprises a closed casing having a bottom wall 22, a top wall 23, side walls 24, and end walls 25. Each casing houses a drive mechanism for five rotary crop conveyors 26 have overlapping paths and disposed above the top wall 23 of the casing, the drive mechanism comprising a gear train which, in use, is immersed in grease to provide the required lubrication but avoiding the necessity of a more precise casing seal which would be needed if oil were employed for the lubricant. The gears of the gear train can be the cheapest available and the train is driven from an input gear 29 secured to an input stub shaft 31 mounted in bearings 32 housed in a bracket 33 attached to the top wall 23 of the casing as best seen in FIG. 3. The lower end of the input shaft 31 carries a bevel gear 34 below the bottom wall 22 of the casing and the upper end of the shaft carries the first crop conveyor 26 which is in the form of a three point starwheel 35 (FIG. 2).

The input shaft 31 drives the other four crop conveyors 26 via the input gear 29, intermediate idler gears 36 (only one of which is shown in FIG. 3) and drive gears 37 keyed to drive stub shafts 38 mounted in upper and lower bearings 39 and 40 in the casing top and bottom walls 23 and 22, respectively, and having the crop conveyors 26 attached to their upper ends. The bearings 40 are mounted in a bearing housing 41. In these four cases, a pair of starwheels 35 is provided on each shaft 38, the starwheels being spaced axially of the shaft. It will be seen from FIG. 3 that the right-hand single starwheel 35 (the rearmost starwheel relative to the overall machine) extends between the pair of starwheels 35 of the next crop conveyor 26, this pair of starwheels extending between the pair of starwheels 35 of the next crop conveyor 26 and so on. This arrangement ensures that the one crop conveyor 26 cleans crop from the preceding crop conveyor which may tend to be carried round by the latter. It will be seen that the left-hand (forwardmost) crop conveyor 26 has an additional starwheel 35' which extends beneath the upper starwheel 35 of the adjacent crop conveyor 26. The drive shaft 38 for the crop conveyor next to the forwardmost conveyor is larger than the rest and carries below the bottom wall 22 of the casing a rotary knife 42 having a plurality of radially extending blades 43 which cooperate with a shear bar 44 mounted on a short transverse strut or beam 45 which is part of the bearing housing 41. FIG. 2 shows that two struts 45 and shear bars 44 are provided, one each for the right hand drive module 13 and cooperating center module 15, and the other for the left-hand module 14 and associated center module 16.

Each drive module 13 to 16 is mounted on the frame by being bolted to the main transverse beam 9 at 46 and to the auxiliary transverse beam at 47. In order to aid the location of each drive module on the frame, dowel pins 48 are provided on the casing bottom wall 22 which are receivable in apertures 49 in the beams 9 and 11.

The main transverse beam 9 is C-shaped and houses within itself a main drive shaft 51 having a sprocket 52 attached to its left-hand end (FIG. 2) which receives motive power from a chain drive of the base unit 2. The shaft 51 carries four bevel gears 53 which mesh with the respective bevel gears 34 of the input shafts 31 of the drive modules 13 to 16. To achieve contra-rotation of the crop conveyors 26 on opposed sides of a given stalkway 17,19, the bevel gears 53 are disposed on opposite sides of the appropriate bevel gears 34 as seen in FIG. 2. The shaft 51 is mounted in spaced bearings 54.

The attachment 1 has solid bottom plates 55 extending beneath the stalkways 17 and 19 and defining the bottom wall thereof the forward end of these plates being in the form of upwardly and rearwardly extending ramps 56. The two outer drive modules 13 and 14 each have a separate protective cover 57 with a common protective cover 58 being provided for the two center modules 15 and 16. The forward ends of the covers 57 and 58 have forwardly tapered noses 59 and 61, respectively, fitted with shoes 62 and the forward ends of the drive modules 13 to 16 are supported by angularly adjustable ground-engaging skids 63 attached to the auxiliary transverse beam 11. The otherwise open lower wall of the main transverse beam 9 is closed by a plate 64.

The attachment 1 is arranged for detachable mounting on the base unit 2, the mounting means comprising a pair of bearing studs 65 mounted at opposite sides on the base unit 2. One of the studs 65 carries an intermediate transverse drive shaft 66 with a pair of drive sprockets 75 and 76, for transferring motive power from the base unit 2 to the attachment 1, as shown in FIG. 2. The studs 65 are engageable by brackets 67 on arms 68 attached to the main transverse beam 9 of the frame of the row crop attachment 1. This arrangement permits limited pivotal movement of the attachment 1 relative to the base unit 2. The lifting of the attachment 1 relative to the base unit 2 is accomplished by a lifting frame 69 pivotally at 71 on the base unit 2 and comprising a pair of forwardly-projecting arms 72 having rollers 73 at their forward ends for engaging the underside of the side beams 12 of the attachment frame, and an upwardly-projecting arm 74 which is coupled at its upper end to a hydraulic cylinder (not shown) supported on the base unit 2. Actuation of the hydraulic cylinder results in an angular displacement of the lifting frame 69 around its pivot 71 and hence also in angular displacement of the attachment 1 around the bearing studs 65. The forward end of the attachment 1 may thus be adjusted vertically to dispose the shoes 62 at the desired height above the ground. The skids 63 may be adjusted to contact the ground surface so as to raise the attachment 1 over rises or obstructions in the field when these are encountered. During the latter operation, the attachment 1 may temporarily separate from the lifting frame 69.

With the parts assembled as set forth above the stalkways 17 and 19 are aligned with respective rows of standing crop and the machine moved forwardly so that the crop first enters the respective mouths 18 and 21, urged by the forwardmost crop conveyors 26, and is then cut by the rotary knives 42 in conjunction with the shear bars 44. The cut crop is then conveyed along the associated stalkway 17, 19 by the other rotary crop conveyors, disposed on opposite sides thereof, to the feed rolls 3 and chopping mechanism. As seen in FIG. 2, the paths of the crop conveyors 26 on one drive module (13 or 14) overlap the paths of the crop conveyors 26 on the associated module (15 or 16) relative to the stalkway 17 or 19 defined thereby. This requires that the crop conveyors 26 be driven in timed relationship to avoid the necessity of arranging opposed conveyors in different planes. The gear trains of the drive modules 13 to 16 provide such a timed drive.

Should a drive module 13 to 16 fail for some reason, it is unbolted from the main and auxiliary transverse beams 9 and 11, following removal of its protective cover 57 or 58, and merely lifted off the frame. This lifting action disengages the bevel gear 34 from the associated bevel gear 53 on the main drive shaft 51 and a replacement drive module is fitted, the dowel pins 48 helping to locate the same. This modular replacement is extremely simple to effect and shortens the down time of the machine to a minimum with the operator being spared the necessity of having detailed knowledge of the drive modules which he would require to effect repair as opposed to replacement.

The foregoing has described a row crop apparatus comprising a plurality of intermeshing rotary elements adapted for use in harvesting stalk-type crops.

It is anticipated that aspects of the present invention, other than those specifically defined in the appended claims, can be obtained from the foregoing description and the drawings.

Having thus described the invention, what is claimed is:

1. A row crop apparatus for a harvesting machine comprising:
   a frame including a pair of spaced apart beams;
   a stalkway defined by a pair of adjacent drive modules, each drive module including an enclosed casing housing, a drive mechanism and being of a construction sufficient for retaining a lubricant, each drive module being supported by said pair of spaced apart beams;
   means for detachably securing each drive module to each of said pair of beams;
   means cooperatively locating each module on each beam;
   a plurality of intermeshed crop conveyors rotatably connected to said drive mechanism of each module, the conveyors of one module extending into the stalkway in rotatable intermeshed relationship with the conveyors of the adjacent module; and
   means connected to one of said beams for rotatably driving the conveyors.

2. The apparatus of claim 1 wherein the means for driving the conveyors includes:
   a main drive connected to the frame and being of a construction sufficient for engagement with a drive source on the harvesting machine; and
   means in each module for being driven by said main drive, said means being a portion of a gear train.

* * * * *